United States Patent [19]

Lee et al.

[11] Patent Number: 4,475,113

[45] Date of Patent: Oct. 2, 1984

[54] DROP-ON-DEMAND METHOD AND APPARATUS USING CONVERGING NOZZLES AND HIGH VISCOSITY FLUIDS

[75] Inventors: Francis C. Lee, San Jose; Ross N. Mills; Frank E. Talke, both of Morgan Hill, all of Calif.

[73] Assignee: International Business Machines, Armonk, N.Y.

[21] Appl. No.: 472,411

[22] Filed: Mar. 4, 1983

Related U.S. Application Data

[63] Continuation of Ser. No. 274,989, Jun. 18, 1981, abandoned.

[51] Int. Cl.[3] .......... G01D 15/18

[52] U.S. Cl. .......... 346/1.1; 106/20; 346/140 R

[58] Field of Search .......... 346/140 R, 75, 1.1; 106/20, 23

[56] References Cited

U.S. PATENT DOCUMENTS

| | | | |
|---|---|---|---|
| 3,683,212 | 8/1972 | Zoltan | 346/140 X |
| 3,715,219 | 2/1973 | Kurz | 346/1.1 X |
| 3,887,928 | 6/1975 | Ohno | 346/140 |
| 3,946,398 | 3/1976 | Kyser | 346/140 X |
| 4,157,935 | 6/1979 | Solyst | 156/644 |
| 4,176,361 | 11/1979 | Kawada | 346/140 X |
| 4,209,794 | 6/1980 | Kattner | 346/140 |
| 4,290,072 | 9/1981 | Mansukhani | 346/1.1 |

FOREIGN PATENT DOCUMENTS 1350836 4/1974 United Kingdom .

OTHER PUBLICATIONS

Pelkie et al., Ink Jet Head; IBM TDB vol. 20, No. 2, Jul. 1977, pp. 553-554.

Welch et al., High Viscosity Drop-on-Demand Inks, IBM TDB, vol. 24, No 7B, Dec. 1981, pp. 3944-3945.

*Primary Examiner*—Joseph W. Hartary

*Attorney, Agent, or Firm*—Otto Schmid, Jr.

[57] ABSTRACT

A drop-on-demand ink jet printing method and apparatus in which the print head has an ink cavity which is filled with ink, and which has a nozzle designed so that ink does not flow out under static conditions. An electromechanical transducer is selectively energized in response to print data signals so that, when energized by an electrical signal, the transducer produces a pressure wave in the ink cavity sufficient to eject one ink drop from the nozzle for each signal above a threshold value. The nozzle is a strongly convergent nozzle and the ink has a viscosity up to 100 centipoise. In the preferred embodiment, the nozzle is formed by anisotropic etching in a silicon substrate. An array of print heads produces a line of high-resolution printing as the print head array is moved across a print medium.

8 Claims, 6 Drawing Figures

DROP-ON-DEMAND METHOD AND APPARATUS USING CONVERGING NOZZLES AND HIGH VISCOSITY FLUIDS

This is a continuation of application Ser. No. 274,989 filed June 18, 1981 now abandoned.

DESCRIPTION

1. Field of Invention

This invention relates to an ink jet print head and, more particularly, to an ink jet print head and method for generating ink drops on demand under control of a suitable electrical signal.

2. Description of Prior Art

Ink jet printing has been known in the prior art, including systems which use a pressure generated continuous stream of ink, which is broken into individual drops by a continuously energized transducer. The individual drops are selectively charged and deflected either to the print medium for printing or to a sump where the drops are collected and recirculated. Examples of these pressurized systems include U.S. Pat. Nos. 3,596,275 to Sweet, and 3,373,437 to Sweet et al. There have also been known in the prior art ink jet printing systems in which a transducer is used to generate ink drops on demand. One example of such a system is commonly assigned U.S. Pat. No. 3,787,884 to Demer. In this system, the ink is supplied to a cavity by gravity flow and a transducer mounted in the back of the cavity produces motion when energized by an appropriate voltage pulse, which results in the generation of an ink drop so that only those ink drops required for printing are generated. A different embodiment of a drop-on-demand printing system in which the transducer is radially arranged is shown in U.S. Pat. No. 3,683,212 to Zoltan. The prior art drop-on-demand printing systems have been limited by low drop production rates, low resolution, and low efficiency. Typical prior art drop-on-demand printing systems have utilized a constant cross-section nozzle and ink having a viscosity during operation lower than 10 centipoises. Attempts to increase the drop production rates have led to stream instability as a result of the low viscosity ink used. Attempts to increase the ink viscosity to improve stream stability have led to choking of the nozzles and termination of ink flow due to the increased internal friction in the nozzle. A decrease in the length of the nozzle in an effort to decrease the friction resulted in unreliable nozzle operation due to air intake caused by meniscus dynamics.

SUMMARY OF THE INVENTION

Briefly, according to the invention, there is provided a drop-on-demand ink jet printing method and apparatus comprising a print head having a fluid chamber supplied with a suitable high viscosity marking fluid. An orifice comprising a strongly converging nozzle is in fluid communication with the fluid chamber, and an electromechanical transducer is mounted in mechanical communication with the fluid chamber. The transducer is selectively energized with a series of signals so that one drop of the marking fluid is ejected from the orifice for each of the signals having at least a predetermined amplitude.

DESCRIPTION OF THE PREFERRED EMBODIMENTS

Figure 2:
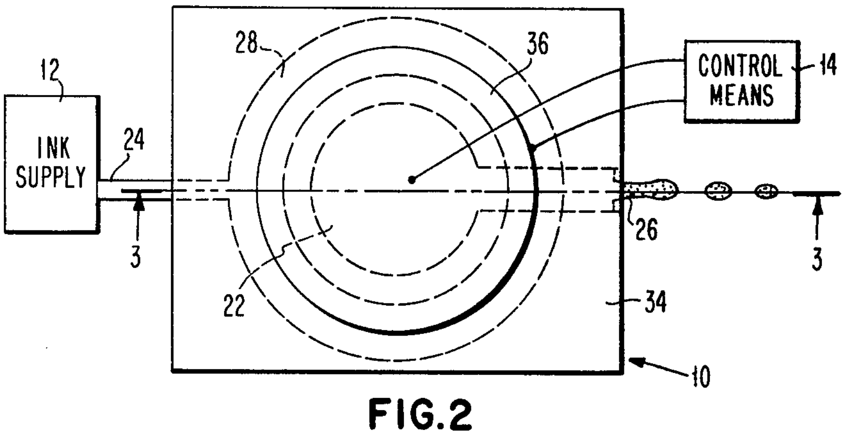
FIG. 2 is a drop-on-demand ink jet printer embodying a converging nozzle.
Figure 3:
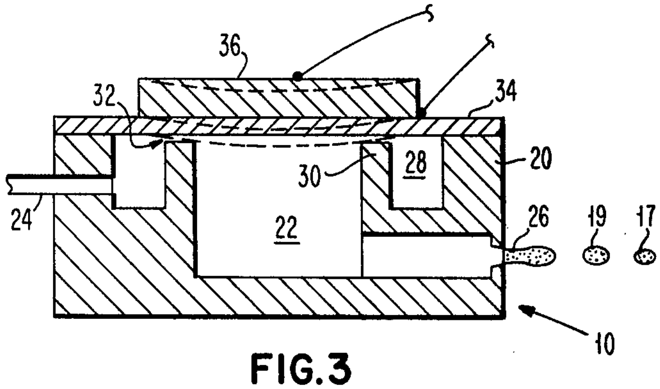
FIG. 3 is a section view taken along line 3—3 of FIG. 2 of the drop-on-demand ink jet print head.

Referring to FIG. 2, the printer apparatus comprises a print head 10 to which is supplied high viscosity liquid ink from ink supply means 12. The viscosity requirement is a funtion of nozzle size and maximum drop-on-demand drop production rate. The viscosity for inks for high resolution printing extends up to 100 centipoises, and the viscosity can be substantially higher for applications in which lower resolution is suitable. Control means 14 provides the voltage control pulses to selectively energize print head 10 to produce one ink drop for each voltage pulse supplied to print head 10. Print head 10 comprises head body 20 having a chamber or cavity 22 formed therein. Cavity 22 is maintained filled with ink through supply line 24 from ink supply means 12. Ink from supply means 12 is not pressurized so the ink in cavity 22 is maintained at or near atmospheric pressure under static conditions. An exit from cavity 22 is provided by nozzle portion 26 which is designed so that the ink does not flow out of nozzle poriton 26 under static conditions. An intermediate ink reservoir 28 is formed in head body 20 and is separated from cavity 22 by internal wall portion 30. The top of cavity 22, as shown in FIG. 2, is closed by a suitable transducer means which is fixed to the head body. Internal wall portion 30 is designed so that a narrow passgeway 32 is provided for the transfer of liquid ink from intermediate ink reservoir 28 to ink cavity 22. The transducer means comprises a membrane member 34 which is fastened to an electromechanical transducer 36. Transducer 36 displaces radially when energized with a suitable voltage pulse and bends membrane 34 inwardly (as shown dotted in FIG. 3), and produces a pressure wave in cavity 22 so that liquid ink is expelled out through nozzle portion 26 to form a single drop. Control means 14 provides the voltage control pulses to selectively energize transducer 36 to produce one ink drop for each voltage pulse applied to transducer 36.

Figure 1:
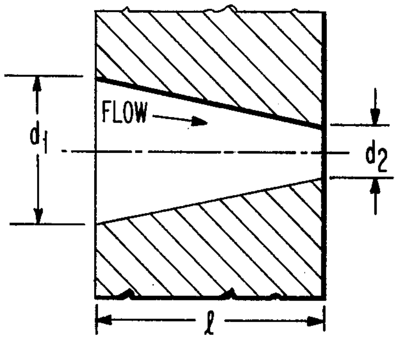
FIG. 1 is a schematic view showing a converging nozzle.

According to the invention, nozzle portion 26 of the drop-on-demand ink jet printing apparatus comprises a converging nozzle. As shown in FIG. 1, the nozzle has an entrance dimension $d_1$, which is larger than the exit dimension $d_2$. The nozzle shown in the drawing has a substantially linear taper in the dimension of the nozzle along its physical length l, however, other tapers such as a horn configuration would also be suitable. The flow through the nozzle is in the direction from the larger opening to the smaller opening, as shown by the arrow.

From a fluid mechanics viewpoint, the effective viscous length $l_{d2}$ of a converging nozzle can be calculated as $$l_{d2}=\tfrac{1}{3}[(d_2/d_1)^3-1]d_2 l/(d_2-d_1)$$

where $d_1$, $d_2$ are the dimensions at the entrance and exit of the converging section, respectively, and l is the physical length of the nozzle (see FIG. 1). Thus, it can be seen that the converging nozzle is physically "long" by hydraulically "short". Since the converging nozzles are "short", the converging nozzles do not provide reliable drop-on-demand operation when using prior art ink formulations having moderate viscosities up to about 16 centipoises due to drop formation instability. However, it was found that highly reliable drop-on-demand operation can be produced with converging nozzles when using marking fluids having a substantially higher viscosity than typical prior art systems. Although the prior art systems using constant cross-section nozzles would not even work in the drop-on-demand mode when utilizing marking fluids of the substantially higher viscosity (up to 100 centipoises for high resolution printing, for example), the combination of the converging nozzle and the high viscosity marking fluids produced not only highly reliable drop-on-demand operation, but also much higher drop-on-demand drop production rates than those obtainable by prior art drop-on-demand ink jet printers.

The operator was superior in other ways as well. For example, air ingestion into the nozzle is completely inhibited and the stream stability is improved so that a stream of drops of equal size and spacing can be produced. The stream directionality is improved, and the jet velocity is easily increased which is essential for high speed printing. The nozzle can be operated at any frequency in the frequency spectrum up to 120 kHz without jet failure, and the nozzle can be operated up to 80 kHz drop-on-demand drop production rate in high resolution printing operation.

The converging nozzle can be produced by any suitable technique. The preferred technique for producing a converging nozzle is by anisotropically etching the nozzle in a silicon substrate. This technique will be described with reference to the embodiment of the drop-on-demand print head shown in FIG. 4. The print head comprises cylindrical transducer member 60 closed at one end by a nozzle plate 62, having formed therein nozzle portion 64. The other end of the transducer is fixed to body member 66. When transducer 60 is actuated by a suitable voltage drive pulse, transducer 60 is deflected to the position shown dotted in FIG. 4 to cause a single drop of ink 78 to be expelled out through nozzle portion 64.

Nozzle plate 62 comprises a silicon substrate formed of single crystal material oriented with the (100) planes parallel to the front surface. The front surface 68 and the rear surface 70 of the nozzle plate are coated with etchant masking material. An aperture is made in the masking material on the rear surface of the nozzle plate. The nozzle plate is then subjected to a suitable anisotropic etching solution such as a water, amine, pyrocatechol etchant, for example. It has been known for some time that the (111) plane is a slow etch plane in single crystal silicon. The nozzle is etched in the form of a truncated pyramid type opening with a square entrance aperture, tapered sides, and a smaller square exit aperture. The tapered sides form an angle $\alpha$ of 54.7° to the front surface since the etching is along the crystal planes of the silicon substrate. The etching is continued until an exit aperture of the desired size is formed.

In a particular embodiment, the silicon nozzle plate was five mils thick and the nozzle plate was etched to produce a two mil square exit aperture. In an embodiment similar to that shown in FIG. 4, the print head, including the above-described nozzle plate, produced reliable drop-on-demand operation up to a drop production rate of 60 kHz at a resolution of 240 pels/inch. This resolution is considered high resolution printing since it produces print resolution approaching that of engraved type. However, the print quality began to decline at drop production rates over 40 kHz. In this apparatus, inks having a viscosity with a range from about 15 centipoises up to 100 centipoise worked to produce ink drops in a drop-on-demand mode, and the preferred range of viscosity was from 20 to 40 centipoises.

Figure 4:
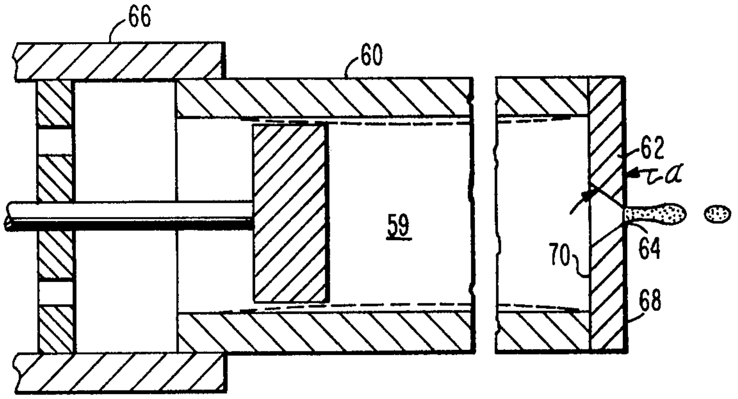
FIG. 4 is a view, partially in section, of an alternate embodiment of a drop-on-demand ink jet print head.

In a second embodiment similar to that shown in FIG. 4, a 1.2 mil square nozzle was used and this apparatus produced printing at a drop-on-demand production rate of 80 kHz at a resolution of 450 pels/inch. This apparatus worked to produce ink drops in the drop-on-demand mode with inks having a viscosity from about 10 centipoises up to about 70 centipoise. The preferred range of viscosity was from about 20 to 40 centipoises.

Figure 6:
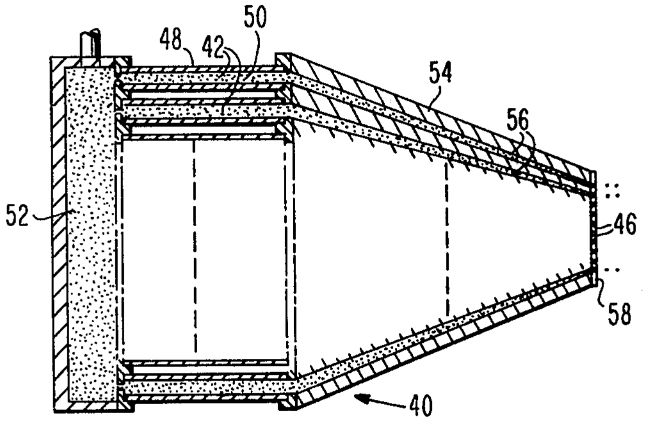
FIG. 6 is a section view taken along lines 6—6 in FIG. 5.
Figure 5:
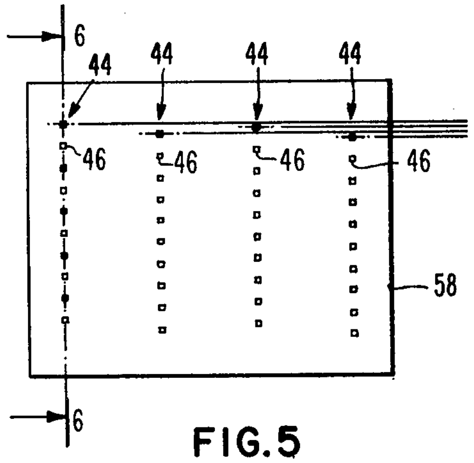
FIG. 5 is a right side view of an array of drop-on-demand ink jet print heads.

FIGS. 5 and 6 show a print head array 40 comprising forty print heads 42 arranged in four rows 44 with corresponding orifices 46 offset so that a line of printing can be produced at a resolution approaching engraved type as the print head moves across a print sheet. Each of the print heads 42 comprises a hollow cylindrical piezoelectric transducer 48 which forms an ink chamber 50 to which ink is supplied from common reservoir 52. A housing 54 is provided which includes a tapered channel 56 for each print head which transmits ink from ink chamber 50 to the corresponding orifice 46 in nozzle plate 58. The orifices are strongly convergent nozzles, as shown in FIG. 6. In the preferred embodiment nozzle plate 58 comprises a single crystal silicon substrate and orifices are formed by anisotropic etching as described above to form square orifices in nozzle plate 58, as shown in FIG. 5.

In a particular embodiment, a forty nozzle array similar to that shown in FIGS. 5 and 6 was constructed with 2 mil square nozzles. This array can be operated to produce printing at a resolution of 240 pels/inch at a drop-on-demand drop production rate of up to 40 kHz. The array operated successfully with ink having a viscosity down to 15 centipoises and up to 100 centipoises. However, the optimum range for the viscosity was 20 to 40 centipoises.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. The method of operating a drop-on-demand ink jet print head comprising the steps of:

providing a drop-on-demand ink jet print head having an ink cavity, an opening comprising a nozzle passage having an entrance dimension and an exit dimension, the ratio of said entrance dimension to said exit dimension being at least four, thereby producing a nozzle passage which converges strongly toward the exit orifice of the nozzle passage communicating with said ink cavity and in which the effective viscous length of said nozzle passage is short with respect to the physical length of the nozzle passage, and an electromechanical transducer mounted in mechanical communication with said ink cavity;

filling said ink cavity with a marking fluid having any selected viscosity in the range of 15 to 100 centipoises at the normal operating temperature; and selectively energizing said electromechanical transducer with a series of signals comprising signals at a base frequency up to 120 kHz to eject one drop of said marking fluid from said opening only when the amplitude of the signal exceeds a predetermined threshold amplitude, whereby said drop-on-demand ink jet print head is capable of operating with a marking fluid at each one of said viscosities throughout the stated range at any given time and with signals at any frequency within the stated range at any given time to produce reliable drop-on-demand printing operation.

2. The method of claim 1 wherein said ink cavity is filled with a marking fluid having a viscosity within the range of from about 20 to about 40 centipoises, said signals for energizing said transducer are produced at a base frequency up to 80 kHz, and said method produces high resolution printing.

3. The method of claim 1 wherein said nozzle passage has an included or apex angle of about 70 degrees.

4. Drop-on-demand ink jet printing apparatus comprising a print head having a fluid chamber supplied with a marking fluid, an orifice in fluid communication with the fluid chamber, an electromechanical transducer mounted in mechanical communcation with the fluid chamber, and a series of signals to selectively energize the transducer to eject one drop of the marking fluid from the orifice only when the amplitude of the signal exceeds a predetermined threshold amplitude, characterized in that:

said orifice comprises a nozzle passage having an entrance dimension and an exit dimension, the ratio of said entrance dimension to said exit dimension being at least four, thereby producing a nozzle passage which converges strongly toward the exit orifice of the nozzle and in which the effective viscous length of said nozzle passage is short with respect to the physical length of said nozzle passage;

said marking fluid has any selected viscosity in the range of 15 to 100 centipoises at the normal operating temperature of said print head; and said series of signals for selectively energizing said electromechanical transducer comprises signals at a base frequency up to 120 kHz, whereby said printing apparatus is capable of operating with a marking fluid at each one of said viscosities throughout the stated range at any given time and with signals at any frequency within the stated range at any given time to produce reliable drop-on-demand printing operation.

5. The apparatus of claim 4 further characterized in that said marking fluid has a viscosity within the range of from about 20 to about 40 centipoises, said signals are produced at a base frequency up to 80 kHz, and high resolution printing is produced.

6. The apparatus of claim 4 further characterized in that a plurality of print heads are arranged in an array comprising offset columns and rows and said signals are produced at a base frequency up to 40 kHz so that a line of high resolution printing can be produced as the array is moved relative to a print medium.

7. The apparatus of claim 1 wherein said nozzle passage has an included or apex angle of about 70 degrees.

8. The apparatus of claim 7 wherein said nozzle passage is anisotropically etched in a silicn substrate formed from single crystal material oriented with the (100) plane parallel to the major substrate surfaces.

* * * * *